US008220232B1

(12) United States Patent
Marvin

(10) Patent No.: US 8,220,232 B1
(45) Date of Patent: Jul. 17, 2012

(54) AQUATIC PLANT REMOVAL RAKE

(76) Inventor: Michael L. Marvin, Lapeer, MI (US)

( * ) Notice: Subject to any disclaimer, the term of this patent is extended or adjusted under 35 U.S.C. 154(b) by 662 days.

(21) Appl. No.: 12/291,489

(22) Filed: Nov. 8, 2008

(51) Int. Cl.
*A01D 44/00* (2006.01)
*A01D 7/00* (2006.01)
(52) U.S. Cl. ................. 56/8; 56/400.08; 56/400.16
(58) Field of Classification Search ............ 56/8, 9, 56/400.01, 400.04, 400.08, 400.09, 400.1, 56/400.16
See application file for complete search history.

(56) References Cited

U.S. PATENT DOCUMENTS

| 647,724 | A | | 4/1900 | McCoy | |
|---|---|---|---|---|---|
| 895,847 | A | * | 8/1908 | Ditchfield | 56/400.04 |
| 994,796 | A | | 6/1911 | Stout | |
| 1,014,250 | A | | 1/1912 | Norman | |
| 1,070,868 | A | | 8/1913 | Worthington | |
| 1,072,568 | A | * | 9/1913 | Buell | 56/400.1 |
| 1,089,542 | A | | 3/1914 | Erwin | |
| 1,187,327 | A | * | 6/1916 | Johnson | 56/400.16 |
| 1,190,962 | A | * | 7/1916 | Smith | 56/400.1 |
| D49,762 | S | * | 10/1916 | Doust | D8/9 |
| 1,352,386 | A | | 9/1920 | Rundberg | |
| 1,666,374 | A | | 4/1926 | Gatti | |
| 1,678,695 | A | * | 7/1928 | Ferguson | 172/372 |
| 2,065,830 | A | | 2/1936 | Sherman | |
| 2,340,917 | A | | 11/1941 | Williamson | |
| 2,635,911 | A | | 4/1953 | Szillage | |
| 2,695,188 | A | * | 11/1954 | Nutt et al. | 294/61 |
| 2,926,478 | A | * | 3/1960 | Jepson | 56/10.3 |
| 2,961,817 | A | * | 11/1960 | Mitchell | 56/8 |
| D190,822 | S | | 7/1961 | Morreale | |
| 3,335,557 | A | | 8/1967 | Boyer | |
| 3,601,956 | A | * | 8/1971 | Akermanis | 56/8 |
| 3,636,689 | A | * | 1/1972 | Gallimore | 56/400.1 |
| D282,621 | S | | 2/1986 | Nuorivaara | |
| 4,852,337 | A | * | 8/1989 | Peterson | 56/8 |
| D306,962 | S | * | 4/1990 | Schuele | D8/13 |
| 4,999,982 | A | * | 3/1991 | Kriger | 56/8 |
| 5,074,105 | A | | 12/1991 | Roth | |
| 5,079,905 | A | * | 1/1992 | Bergstrom | 56/8 |
| D329,177 | S | * | 9/1992 | Nace et al. | D8/13 |
| 5,152,126 | A | * | 10/1992 | Cousineau | 37/342 |
| D344,661 | S | | 3/1994 | Schuele | |
| 6,250,054 | B1 | * | 6/2001 | Kramer | 56/8 |
| 6,748,728 | B2 | * | 6/2004 | Hay | 56/8 |
| 6,851,254 | B1 | * | 2/2005 | Dalfors | 56/400.08 |
| 6,886,318 | B2 | | 5/2005 | Savas | |
| 7,475,527 | B2 | * | 1/2009 | Kucharski | 56/8 |
| 7,771,593 | B2 | * | 8/2010 | Coffman et al. | 210/170.09 |
| 7,784,257 | B2 | * | 8/2010 | Williams et al. | 56/400.08 |
| 7,832,105 | B2 | * | 11/2010 | Vogel | 30/166.3 |
| 2007/0193238 | A1 | * | 8/2007 | Kucharski | 56/8 |

* cited by examiner

*Primary Examiner* — Thomas B Will
*Assistant Examiner* — Joan Misa
(74) *Attorney, Agent, or Firm* — T.L. Garrett, PLC; Tanya L. Garrett

(57) ABSTRACT

An aquatic plant removal rake including a head, having one or more co-planar set of tines integrally formed thereupon, a plurality of implement lugs integrally formed thereupon, and a handle aperture adapted to receive a handle therethrough; a handle having a handle cord end that includes an eyelet adapted to receive a cord therethrough, and a handle head end that includes a handle locating protrusion and that is adapted to be received by the head; a retrieving handle including a retrieving handle cord aperture integrally formed thereupon and adapted to receive a cord, and a grip adapted to be gripped by a user or users; and a cord adapted to place each of the handle and the retrieving handle in mechanical communication with one another, whereby forces transmitted to the retrieving handle are transferred to each of the handle and the head. A method of use is also provided.

4 Claims, 16 Drawing Sheets

AQUATIC PLANT REMOVAL RAKE

FIELD OF THE INVENTION

The present invention generally relates to aquatic plant removal and more specifically to a rake for removing aquatic plants.

BACKGROUND OF THE INVENTION

The use of devices and methods relating to aquatic plant removal are disclosed in U.S. Pat. No. 6,748,728 issued in the name of Hay, U.S. Pat. No. 6,886,318 issued in the name of Savas, U.S. Pat. No. 4,852,337 issued in the name of Peterson, U.S. Pat. No. 5,074,105 issued in the name Roth, U.S. Pat. No. 5,079,905 issued in the name of Bergstrom and U.S. Pat. No. 6,250,054 issued in the name of Kramer.

Conventional aquatic plant removal rakes include only one row of tines and must be oriented in a body of water with the tines faring towards a ground surface to properly remove vegetation.

While existing devices suit their intended purposes, the need remains for a device that provides an easily portable aquatic plant removal rake that is formed from lightweight materials, provides a user with convenient storage and transportation, and is adapted to remove both subaquatic and emergent aquatic vegetation regardless of the orientation of the rake in a body of water.

The present invention provides an easily portable aquatic plant removal rake that provides a user with convenient storage and transport thereof, and that is adapted to remove both subaquatic and emergent aquatic vegetation.

SUMMARY

The aquatic plant removal rake includes a head, having at least one co-planar set of tines integrally formed thereupon, a plurality of implement lugs integrally formed thereupon, and a handle aperture adapted to receive a handle therethrough; a handle having a handle cord end that includes an eyelet adapted to receive a cord therethrough, and a handle head end that includes a handle locating protrusion and that is adapted to be received by the head; a retrieving handle including a retrieving handle cord aperture integrally formed thereupon and adapted to receive a cord, and a grip adapted to be gripped by a user or users; and a cord adapted to place each of the handle and the retrieving handle in mechanical communication with one another, whereby forces transmitted to the retrieving handle are transferred to each of the handle and the head. A method of use is also provided that allows for vegetation removal regardless of orientation of the rake with respect to a ground surface.

FIELD OF THE INVENTION

The invention includes a vegetation removal rake. The rake is an aquatic plant removal rake for subaquatic and emergent aquatic vegetation removal.

BRIEF DESCRIPTION OF THE DRAWINGS

These and other objects, features and advantages of the present invention will become apparent from the following detailed description and the appended drawings in which.

DETAILED DESCRIPTION OF THE INVENTION

As defined herein, the terminology aquatic vegetation or aquatic plant includes any aquatic plant or aquatic algae.

As defined herein, the terminology subaquatic or subaqueous vegetation includes any vegetation located, either in whole or in part, below the surface of a body of water.

As defined herein, the terminology emergent aquatic vegetation includes any vegetation having any portion thereof above or upon the surface of a body of water.

As defined herein, the terminology a body of water includes any ocean, lake, pond, river, stream, creek, flooding, or any other area or surface covered by water.

Figure 20:
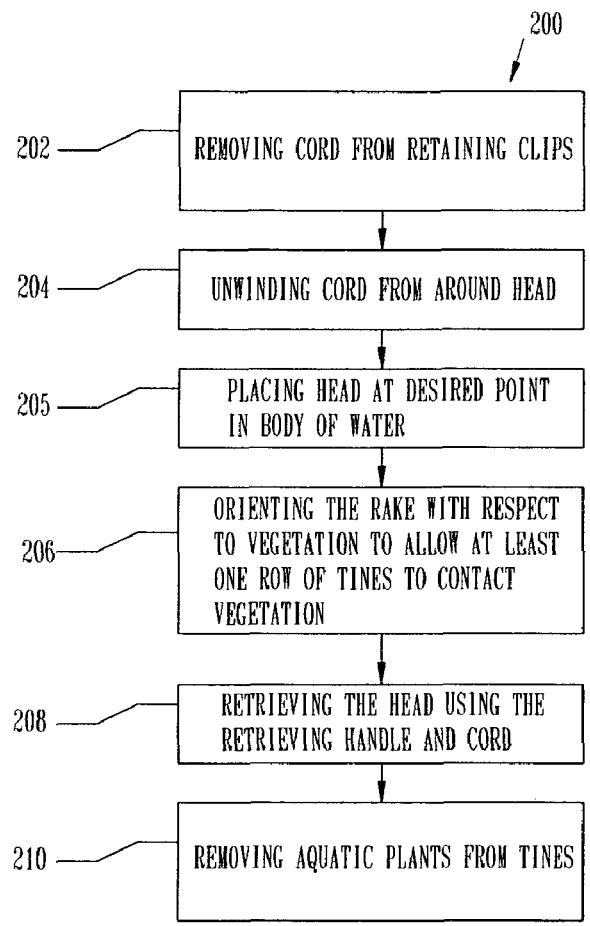
FIG. 20 illustrates a method of using an aquatic plant removal rake in accordance with an embodiment of the invention.
Figure 21:
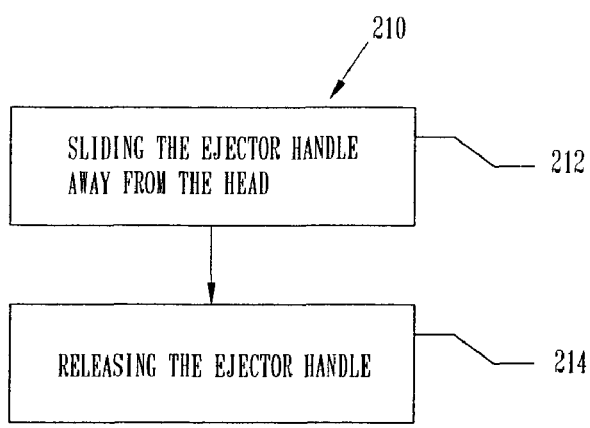
FIG. 21 illustrates a method of removing aquatic plants from a plurality of tines included with an aquatic plant removal rake in accordance with an embodiment of the invention.

In general, FIGS. 1-19, 22 illustrate several embodiments of an aquatic plant removal rake; FIGS. 20-21 illustrate a method of using the aquatic plant removal rake shown in FIGS. 1-19, and 22.

Figure 1:
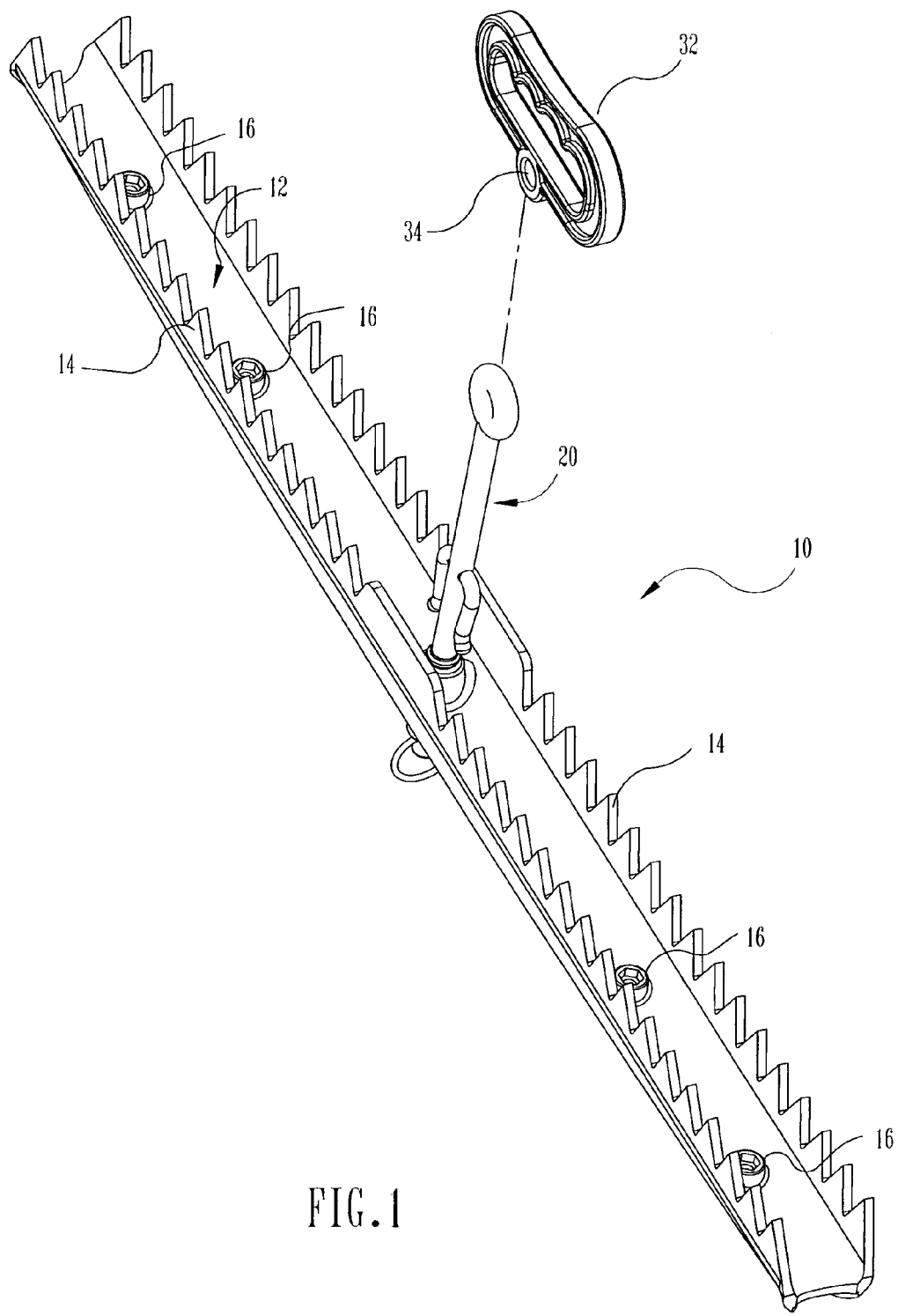
FIG. 1 illustrates a perspective view of an aquatic plant removal rake in accordance with one embodiment of the invention.
Figure 6:
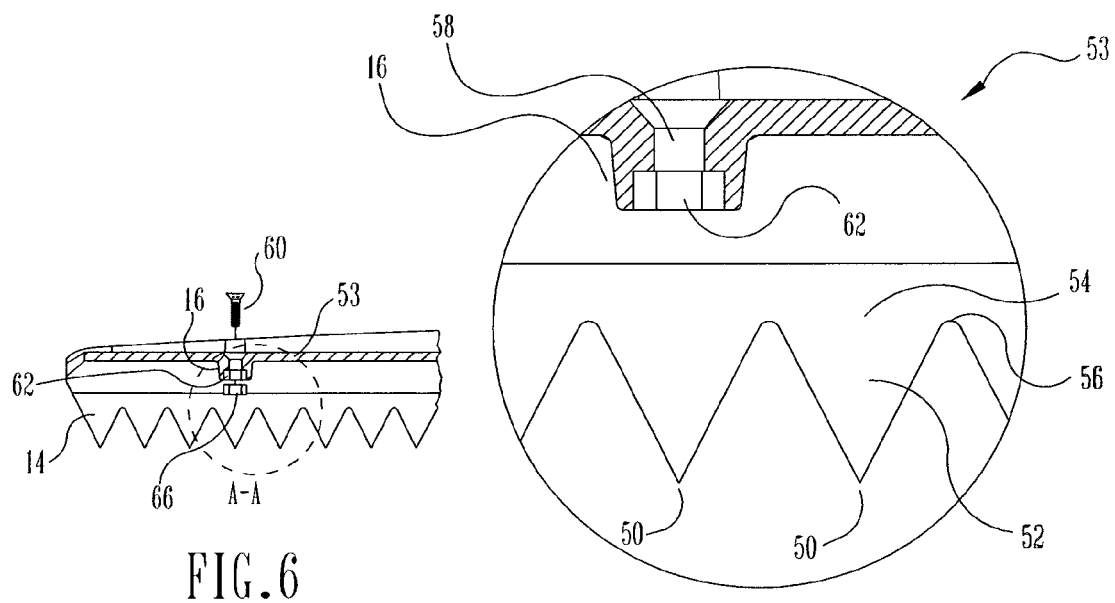
FIG. 6 illustrates a partial cross-sectional view of an aquatic plant removal rake taken along section line 6-6 illustrated in FIG. 5 in accordance with an embodiment of the invention.
Figure 7:
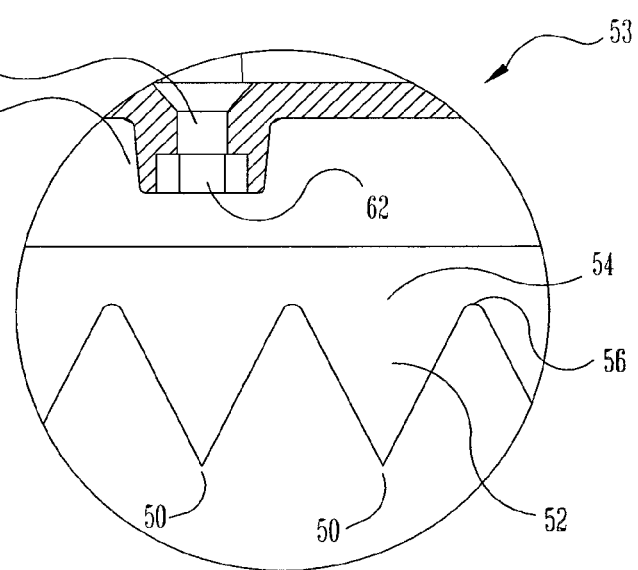
FIG. 7 is a partial detail view of the cross-sectional view of the encircled portion of FIG. 6 of an aquatic plant removal rake in accordance with an embodiment of the invention.
Figure 8:
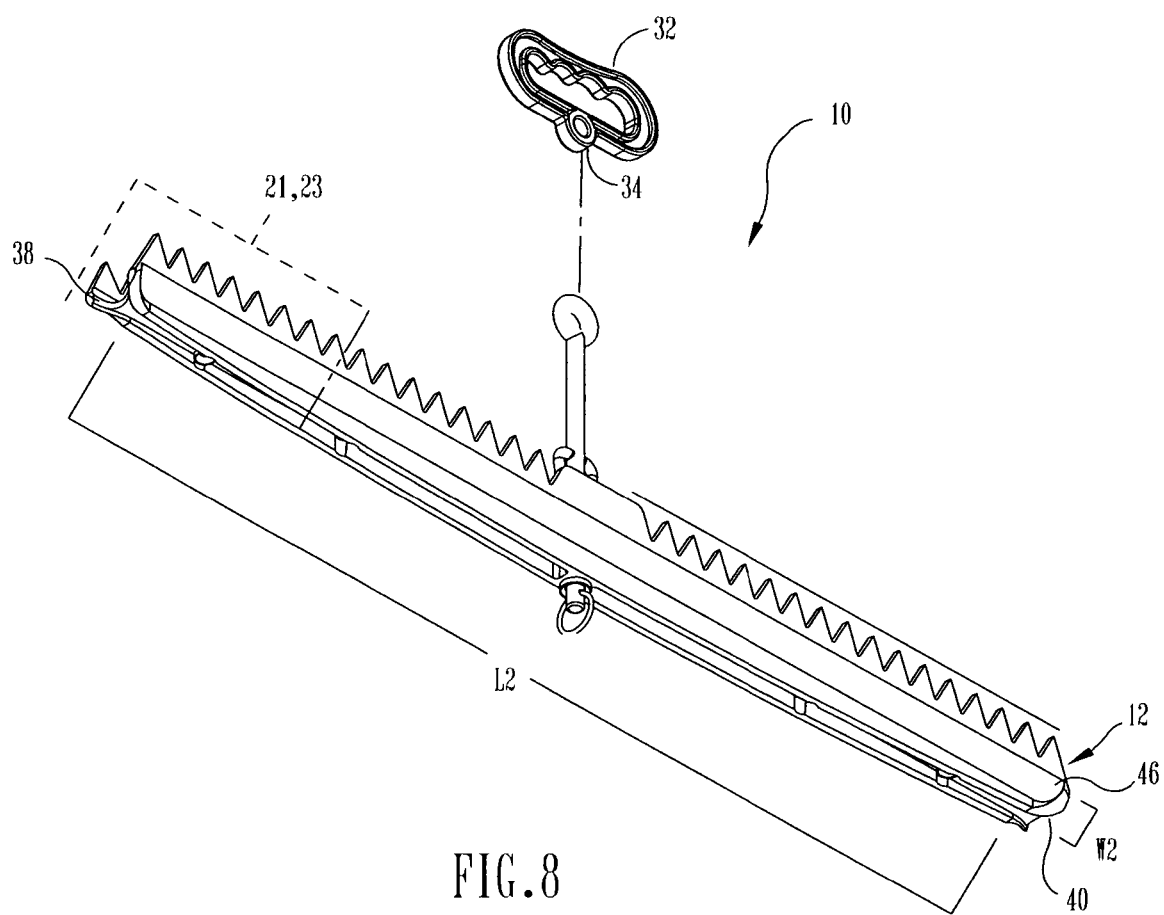
FIG. 8 illustrates a perspective view of an aquatic plant removal rake including a reinforcing rib in accordance with an embodiment of the invention.
Figure 12:
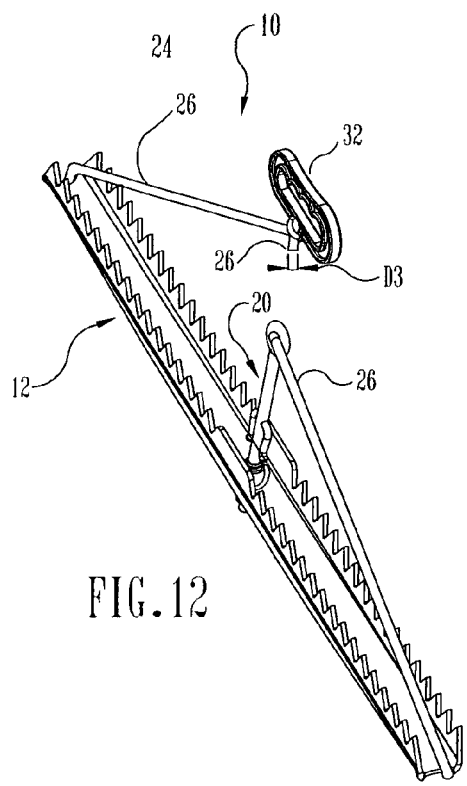
FIG. 12 illustrates perspective view of an aquatic plant removal rake having a handle and cord affixed thereto in accordance with an embodiment of the invention.

FIGS. 1-3, 8, 11-12 illustrate an aquatic plant removal rake 10, and FIGS. 5-7, and 9-10 illustrate portions of the rake 10. FIGS. 1, 8 and 12 illustrates perspective views of the aquatic plant removal rake 10 in accordance with an embodiment of the invention.

Figure 2:
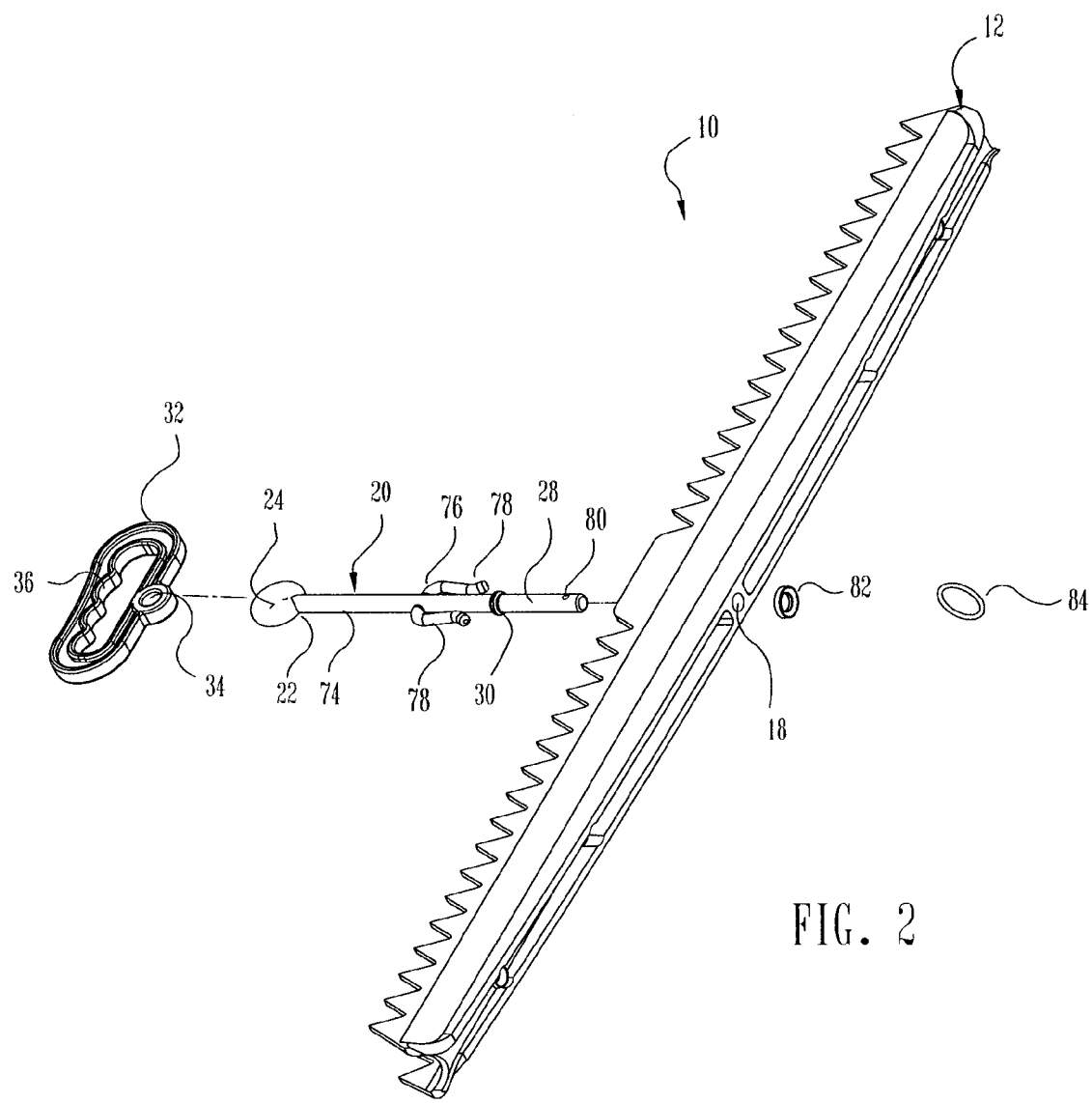
FIG. 2 illustrates an exploded view of an aquatic plant removal rake in accordance an embodiment of the invention.
Figure 3:
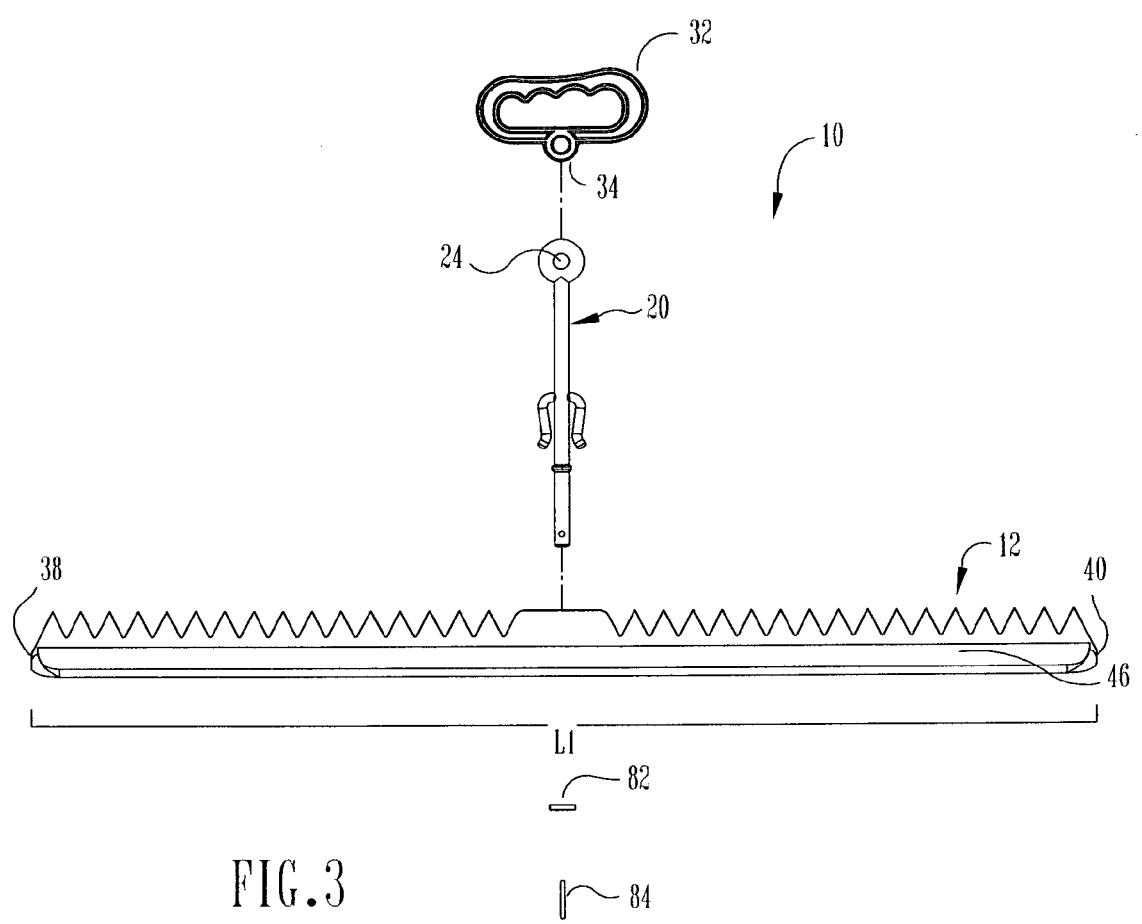
FIG. 3 illustrates an exploded view of an aquatic plant removal rake in accordance with one embodiment of the invention.

FIGS. 2-3 illustrate exploded views of an aquatic plant removal rake 10 in accordance an embodiment of the invention.

Figure 4:
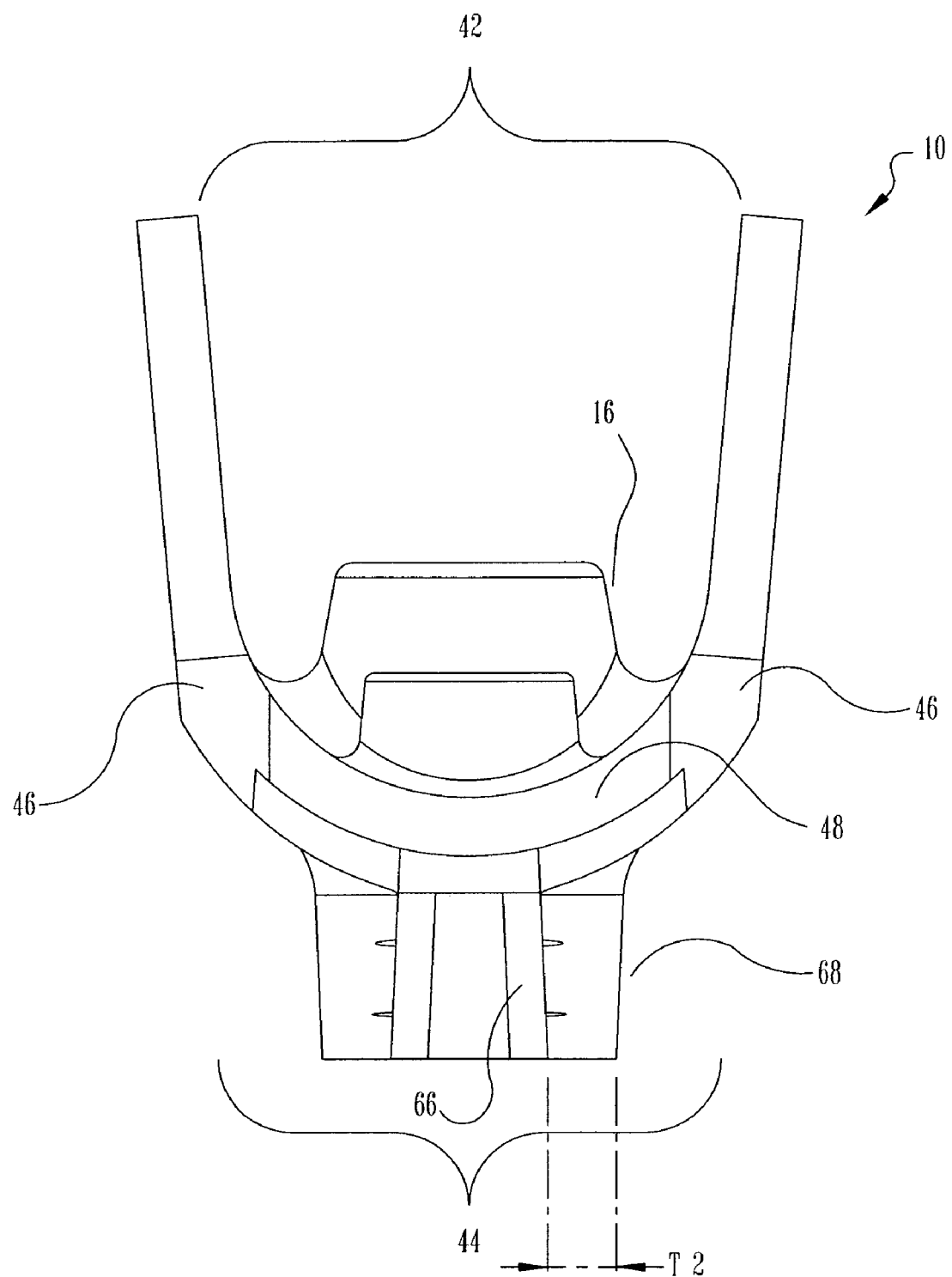
FIG. 4 illustrates an end view of an aquatic plant removal rake shown in FIG. 1 including a reinforcing rib in accordance with an embodiment of the invention.

FIG. 4 illustrates an end view of an aquatic plant removal rake in accordance with an embodiment of the invention.

Figure 5:
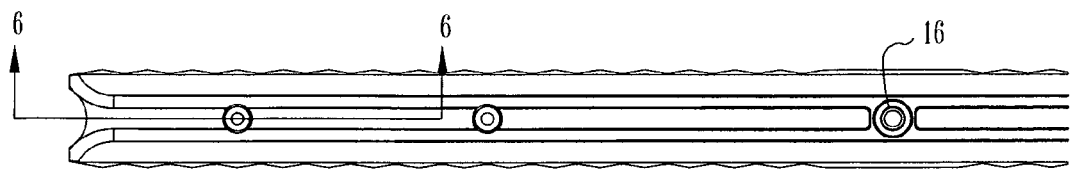
FIG. 5 illustrates a partial top view of an aquatic plant removal rake in accordance with an embodiment of the invention.

FIG. 5 illustrates a partial top view of the aquatic plant removal rake 10 in accordance with an embodiment of the invention.

FIG. 6 illustrates a partial cross-sectional view of the rake 10 taken along section line 6-6 of FIG. 5 in accordance with an embodiment of the invention.

FIG. 7 is a partial detail view of the cross-sectional view of the encircled portion 53 of the rake shown in FIG. 6 in accordance with an embodiment of the invention.

Figure 9:
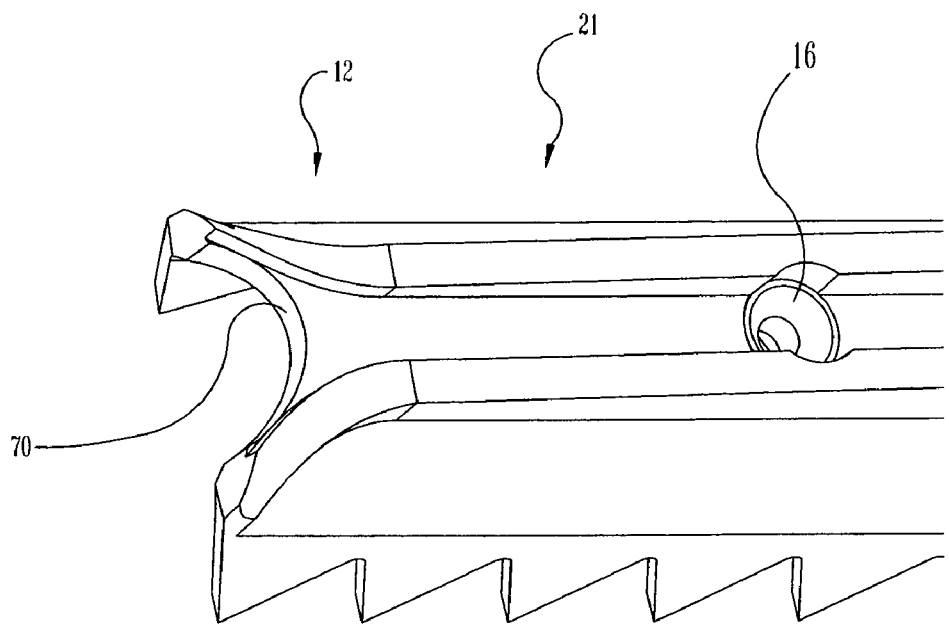
FIG. 9 illustrates a detailed perspective view of a portion of an aquatic plant removal rake having a cord retaining notch as shown in FIG. 8 in accordance with an embodiment of the invention.
Figure 10:
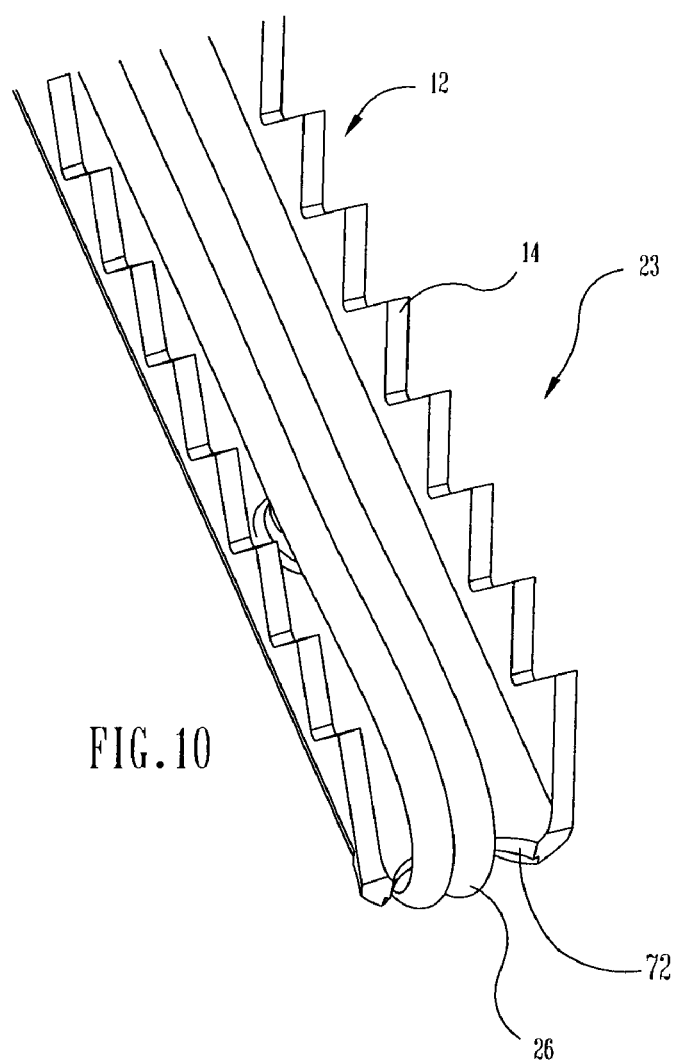
FIG. 10 illustrates a detailed perspective view of a portion of an aquatic plant removal rake as shown in FIG. 8 having a cord wrapped thereupon in accordance with an embodiment of the invention.

FIGS. 9-10 illustrate detailed perspective views of the portions 21 and 23 of the rake 10 shown in FIG. 8.

Referring in particular to FIGS. 1-12, the rake 10 generally including: a head 12, the head 12 having at least one co-planar set of tines 14 integrally formed thereupon, a plurality of implement lugs 16 integrally formed thereupon, and a handle aperture 18, the handle aperture 18 adapted to receive a handle 20 therethrough; a handle 20, the handle 20 having a handle cord end 22 that includes an eyelet 24 adapted to receive a cord 26 (shown in FIGS. 10-12) therethrough, and a handle head end 28 that includes a handle locating protrusion 30 and that is adapted to be received by the head 12; a retrieving handle 32, the retrieving handle 32 including a retrieving handle cord aperture 34 integrally formed thereupon and adapted to receive a cord 26 (shown in FIGS. 10-12), and a grip 36 adapted to be gripped by a user or users; and a cord 26 (shown in FIGS. 10-12), the cord 26 adapted to place each of the handle 20 and the retrieving handle 32 in mechanical communication with one another, whereby forces transmitted to the retrieving handle 32 are transferred to each of the handle 20 and the head 12.

In one embodiment of the invention shown in FIG. 2, the rake 10 includes the head 12 having a handle aperture 18. The handle aperture 18 may include an opening defining a hole passing through the head 12. The handle aperture 18 may be adapted to receive a handle 20 therethrough.

In another embodiment of the invention, the handle aperture 18 may include helical threads (not shown), the threads adapted to receive and mechanically engage corresponding helical threads formed upon the handle 20.

In one embodiment of the invention, shown in FIG. 2 as an exploded perspective view of an aquatic plant removal rake 10 includes a handle 20 defined as an elongate member having a head end 28 and a cord end 22. The handle 20 may be adapted to be received and retained by the head 12, such that the handle 20 is removably secured thereto.

In another embodiment of the invention, the cord end 22 of the handle 20 may include an eyelet 24, the eyelet 24 having a generally circular form and adapted to receive a cord 26 therethrough, whereupon the cord 26 may be knotted or crimped, thereby removably securing the cord 26 to the handle 20.

As shown in FIG. 2 the handle includes a shank 74 that defines the cord end 22 of the handle, the shank operating to define the length of the handle 20, and further operating as a handle 20, providing a user a convenient point at which to grip the handle 20. The shank 74 having a predefined diameter.

In one embodiment of the invention, as shown in FIG. 2, the shank 74 may be a solid tube having an associated peripheral wall.

In another embodiment of the invention, the shank 74 may have a hollow cross-sectional profile (not shown).

In one embodiment of the invention, the handle 20 may include at least one cord retaining clip 76 affixed to the shank 74. The cord retaining clips 76 may operate to be placed in mechanical engagement with the cord 26 (not shown), whereby the cord 26 is removably secured to the shank 74 and is prevented from being inadvertently released therefrom.

In one embodiment of the invention, illustrated in FIG. 2, the at least one cord retaining clip 76 may include a pair of diametrically-opposed prongs 78 formed upon the shank 74 to retain the cord 26 therein.

In one embodiment of the invention, shown in FIG. 2, the head end 28 of the handle 20 includes a predefined diameter adapted to pass through the handle aperture 18; a handle locating protrusion 30; and an opening defining a retaining ring hole 80.

In an embodiment of the invention, shown in FIGS. 2-3, the head end 28 of the handle 20 may be further adapted to receive a retaining washer 82 thereupon, the retaining washer 82 adapted to cooperate with the head 12 to securably retain the head end 28 of the handle 20 in mechanical engagement with the head 12.

In an embodiment of the invention, the retaining ring hole 80 (shown in FIG. 2) may be adapted to receive a split ring 84 therethrough, the split ring 84 adapted to cooperate with each of the head, the head end of the handle 28, and the retaining washer 82 to retain the head end of the handle 28 in mechanical engagement with the head 12. The split ring 84 may be any of those which are commonly known in the art.

In one embodiment of the invention, the handle locating protrusion 30 (shown in FIG. 2) includes a raised ring that may be formed or placed upon the handle 20 that operates to prevent the head end 28 of the handle 20 from passing more than a predefined distance through the handle aperture 18. The handle locating protrusion 30 may operate to halt passage of the head end 28 of the handle 20 through the handle aperture 18 by having a predefined diameter greater than that of the handle aperture 18.

In one embodiment of the invention, the handle locating protrusion 30 may be integrally formed with the head end of the handle 28.

In another embodiment of the invention, the handle locating protrusion 30 may be a ring that is pressed or pushed onto the head end of the handle 28. The ring may be a tight friction fit, or may be secured to the head end of the handle 28 in a desired position via adhesive, welding, or other suitable means of attachment.

In one embodiment of the invention, the handle 20 may be formed of any material providing sufficient rigidity, resilience, corrosion resistance, and durability. Materials from which the handle 20 may be formed include, but are not limited to: steel, stainless steel, aluminum, non-metallic composites, and plastics.

In one embodiment of the invention, illustrated in FIGS. 3-4, the head 12 includes a predefined length L1 (shown in more detail in FIG. 3) defined by a first head end 38 and a second head end 40; a tine face 42 (shown in FIG. 4) having at least one generally coplanar row of tines 14 formed thereupon; a reinforcing face 44, the reinforcing face 44 having at least one reinforcing rib 46 formed thereupon, and a wall 48 (shown in FIG. 3), the wall 48 having a predefined length equal to length L1 defined by the length of the head 12 and operating to separate the tine face 42 and the reinforcing face 44 from one another; at least one implement attachment lug 16 integrally formed thereupon; and a handle aperture 18, the handle aperture 18 adapted to receive the handle 20 therethrough.

In one embodiment of the invention, the head 12 may be formed of any material of sufficient rigidity to prevent deformation of the head 12 whilst the rake 10 is being retrieved or engaging aquatic vegetation.

In another embodiment of the invention, the head 12 may be formed of any material having a neutral or negative buoyancy such that the head 12 does not float when placed into water, but instead may either remain submerged at a desired depth or may sink.

Materials that may be used to form the head 12 may include, but are not limited to: polyvinyl chloride, plastics, thermoplastics, metals, non-metallic composites, or any other material having the desired characteristics.

The head 12 is adapted to be used in an orientation that is substantially parallel to a ground surface supporting the aquatic vegetation. An additional row of tines 14 allows the orientation of the rake to cause either row of tines to contact the vegetation.

In an embodiment of the invention, shown in FIGS. 1-3, 8 and 11-12, 8, the rake 10 includes a head 12 including at least one reinforcing rib 46, the reinforcing rib 46 adapted to provide added rigidity to the head 12 such that deformation of the head 12 when the head 12 is placed under a load is minimized.

In an embodiment of the invention, the reinforcing rib 46 of the rake 10 is formed on the reinforcing face 44 (shown in FIG. 4) of the head 12 and includes an associated length L2, which may correspond to the length of the head 12; an associated width W2, the width defined by the extent of the protrusion of the reinforcing rib 46 from the reinforcing face 44; and an associated thickness T2, the thickness defined by the distance between an upper rib surface 66 and a lower rib surface 68, as illustrated in FIG. 4.

FIG. 5 illustrates a partial top view of the aquatic plant removal rake 10 in accordance with an embodiment of the invention.

FIG. 6 illustrates a partial cross-sectional view of the rake 10 taken along section line 6-6 of FIG. 5 in accordance with an embodiment of the invention.

In one embodiment of the invention, illustrated in FIGS. 3-5, and 7 the tine face 42 of the head 12 (shown as a top plan view in FIG. 5) includes an arcuate cross-sectional profile (shown in FIG. 4) defined by a plurality of tine apices 50 (shown in FIG. 7) and the wall 48.

In one embodiment of the invention illustrated in FIGS. 5-7, the tines 14 include a plurality of coplanar triangular protrusions 52, each respective triangular protrusion including both an associated base 54 and an associated tine apex 50.

In one embodiment of the invention, shown in FIGS. 3, 5-7 the tines 14 include a plurality of coplanar triangular protrusions 52 formed in a linear array extending along the tine face 42 of the head 12, with the length of the linear array defined by each of the first head end 38 and the second head end 40.

In another embodiment of the invention, as shown in FIG. 1 the tines 14 may include a plurality of rows of tines 14, with each respective row of tines 14 formed such that each row of tines 14 is substantially parallel to each of the other respective rows of tines 14 of the plurality of rows of tines 14.

In one embodiment of the invention, illustrated in FIG. 7 the tines 14 include a plurality of radii 56, with each respective radius 56 formed between the respective associated bases 54 of two adjacent triangular protrusions 52, with each respective radius 56 adapted to engage and retain aquatic vegetation therein.

In one embodiment of the invention, illustrated in FIGS. 4, 6-7, the head 12 includes a plurality of implement lugs 16. Each respective implement lug 16 of the plurality of implement lugs 16 may include an implement aperture 58 formed in the wall 48 and adapted to provide a means whereby a fastener 60 may pass through the wall 48. In one embodiment of the invention, the fastener 60 may be a helically-threaded bolt or screw, as is commonly known in the art.

In another embodiment of the invention, illustrated in FIGS. 4, 5-7, each respective implement lug 16 may include a nut-receiving cavity 62, the nut-receiving cavity 62 including a peripheral wall adapted to receive a helically-threaded nut 66 having a plurality of sides therein. The peripheral wall of the nut-receiving cavity 62 may be further adapted to engage the plurality of sides of the nut 66 such that the nut 66 is unable to rotate within the nut-receiving cavity 62 whereby the nut 66 need not be held by a user when the fastener 60 is threaded into the nut 66.

FIGS. 9-10 respectively illustrate detailed partial perspective views of rake portions 21 and 23 of the rake 10 shown in FIG. 8, respectively.

In one embodiment of the invention, illustrated in FIGS. 9-10, rake portion 21 includes the head 12 includes a first cord storage notch 70 and a second cord storage notch 72 as shown in FIG. 10. Each of the cord storage notches 70, 72 is respectively formed at the first head end 38 and second head end 40 (shown in FIG. 8), respectively. Each of the cord storage notches 70,72 may include an arcuate portion formed in each of the first and second head ends 38,40 as illustrated in FIG. 8.

As illustrated in FIGS. 9-10, the cord storage notches 70,72 may permit a cord 26 (included in portion 23 shown in FIG. 10) to wrapped around the head 12 longitudinally, such that the cord storage notches 70,72 operate to retain the cord 26 from sliding off of the first and second head ends 38,40 (shown in FIG. 8) when the cord 26 is wrapped around the head 12.

In one embodiment of the invention, illustrated in FIGS. 1-3, 8, 11-13, 15, and 18-19 aquatic plant removal rakes 10 (FIGS. 1-3, 8, 11-12), 300 (FIG. 13), 700 (FIG. 15), and 800 (FIGS. 18-19) may include a retrieving handle 32. The retrieving handle 32 may be formed of any geometric shape having an opening formed therethrough adapted to allow fingers of a user to pass therethough, whereby a user may easily grasp the retrieving handle 32. As shown in the nonlimiting embodiments of FIGS. 1-3, 8, 11-13, 15, and 18-19, the handle is depicted for illustrative purposes as having an obround shape.

Figure 11:
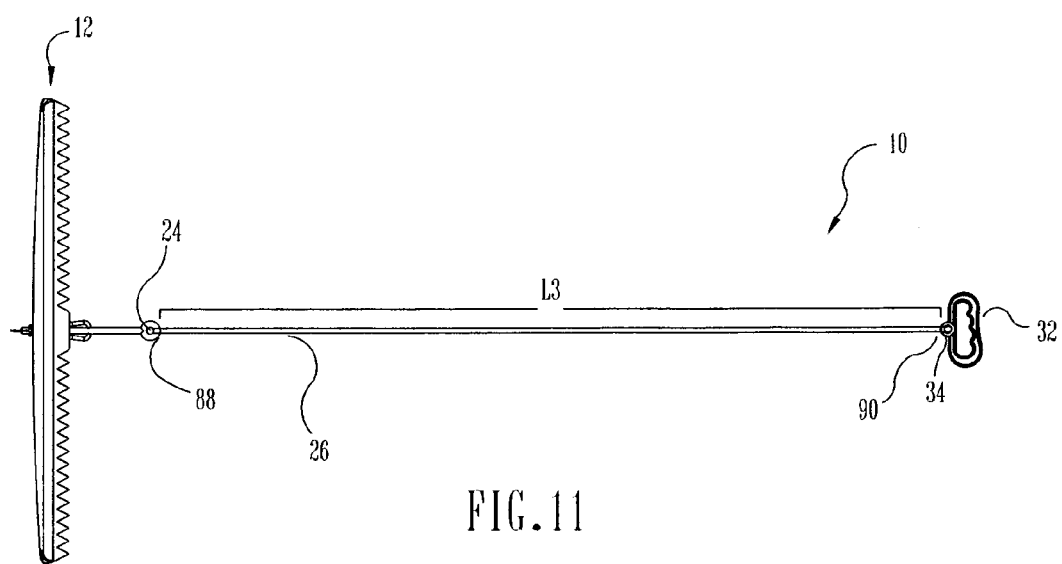
FIG. 11 illustrates a plan view of an aquatic plant removal rake including a cord and a retrieving handle in accordance with an embodiment of the invention.

In another embodiment of the invention, the retrieving handle 32 includes a retrieving handle cord aperture 34, the cord aperture 34 adapted to receive the cord 26 (shown in FIGS. 10-12). The cord 26 may then be knotted or crimped, whereby the cord 26 is fixably secured to the retrieving handle 32.

In one embodiment of the invention, the retrieving handle 32 may be formed from any material having sufficient rigidity, resilience, corrosion resistance, and durability. The retrieving handle 32 may be formed from materials including, but not limited to: steel, stainless steel, aluminum, non-metallic composites, and plastics.

In one embodiment of the invention shown in FIGS. 10-12, the aquatic plant removal rake 10 includes a cord 26. The cord 26 is adapted to place the handle 20 in mechanical communication with the retrieving handle 32.

In one embodiment of the invention, illustrated in FIG. 11 the cord 26 includes a handle end 88 and a retrieving handle end 90. The cord 26 also includes a predefined length L3, the length L3 defined by the cord handle end 22 and the cord retrieving handle end 90.

The cord 26 has a predefined diameter D3. The diameter D3 of the cord 26 may correspond with the desired strength of the cord 26, as a larger diameter cord 26, given the same material, has a higher breaking point than that of a cord 26 formed from the same material and of a smaller diameter.

The cord 26 may be formed of any material having sufficient strength, elasticity, abrasion resistance, ultraviolet light resistance, corrosion resistance, and light weight.

In one embodiment of the invention, the cord 26 may be formed from materials including, but not limited to: rope, twine, natural fibers, synthetic fibers, metal cable, coated metal cable, or the like.

In one embodiment of the invention, illustrated in FIGS. 13-14 and 18-19, the aquatic weed rakes 300, 800 may include a float 92. The float 92 may include a generally arcuate cross-sectional profile and further include a predefined length L4, the predefined length L4 defined by a first float end 94 and a second float end 96. The float 92 may also include an associated predefined thickness T4, the predefined thickness T4 defined by the distance between an inner float surface 98 and an outer float surface 100.

The float 92 may be formed from any material having sufficient buoyancy to sustain the aquatic plant removal rake 10 at the surface of a body of water. The material used to form must also be resistant to water absorption, resistant to degradation due to ultraviolet light, and sufficiently rigid so as to retain the shape of the float 92 when pulled through the water.

In one embodiment of the invention, the float 92 may be formed from materials including, but not limited to open- or closed-cell polyethylene foam and open- or closed-cell ethylene-vinyl acetate foam.

The rake 300 including a float 92 is similar in structure to rakes 10 (shown in FIGS. 1-12). In one embodiment of the invention, the fasteners 60 operate to retain the float 92 to head 12 may include helically threaded bolts or machine screws, each adapted to mechanically engage a corresponding helically threaded nut 66 retained in the implement lug 16.

Figure 13:
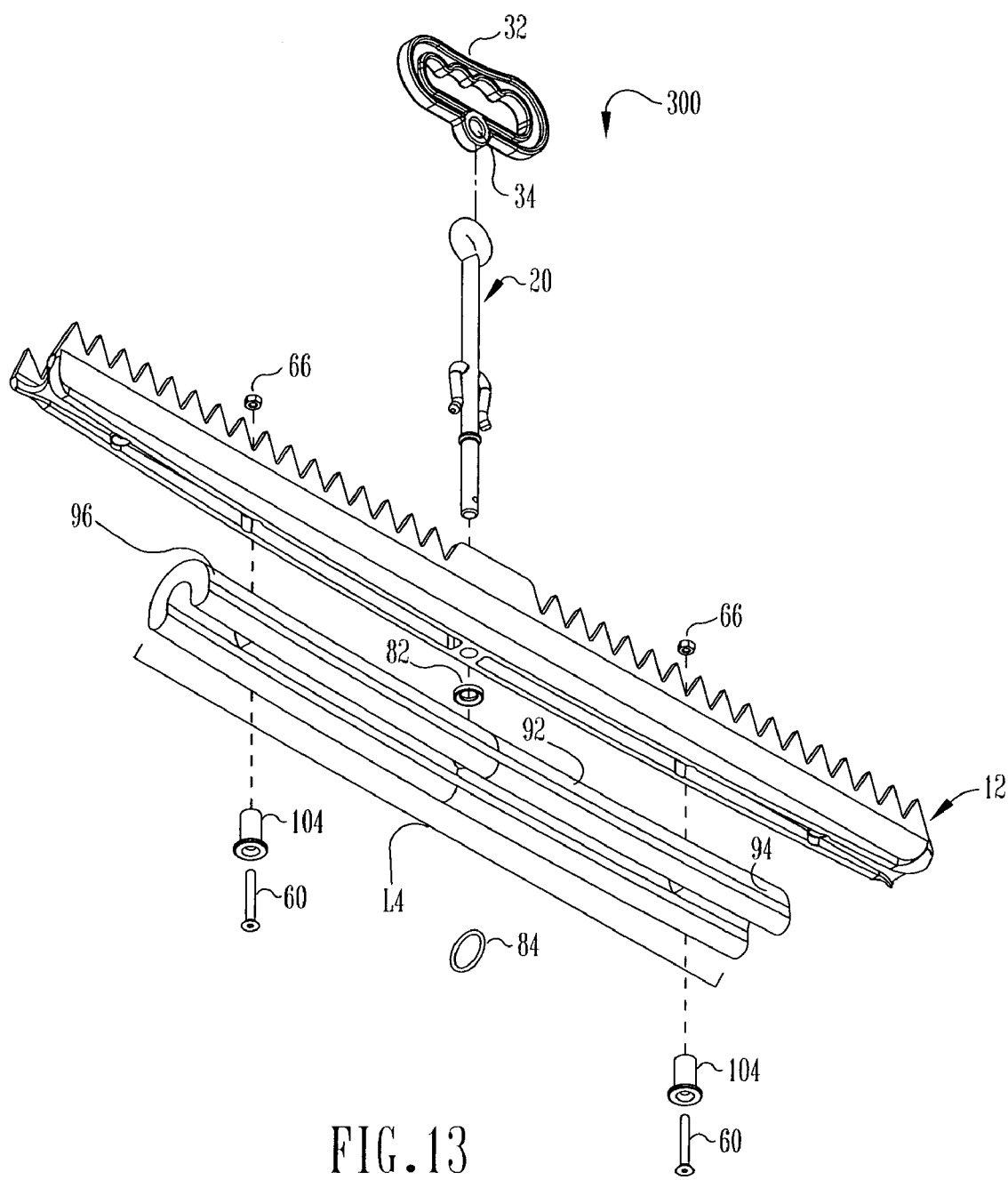
FIG. 13 illustrates an exploded perspective view of an aquatic plant removal rake including a float in accordance with an embodiment of the invention.
Figure 14:
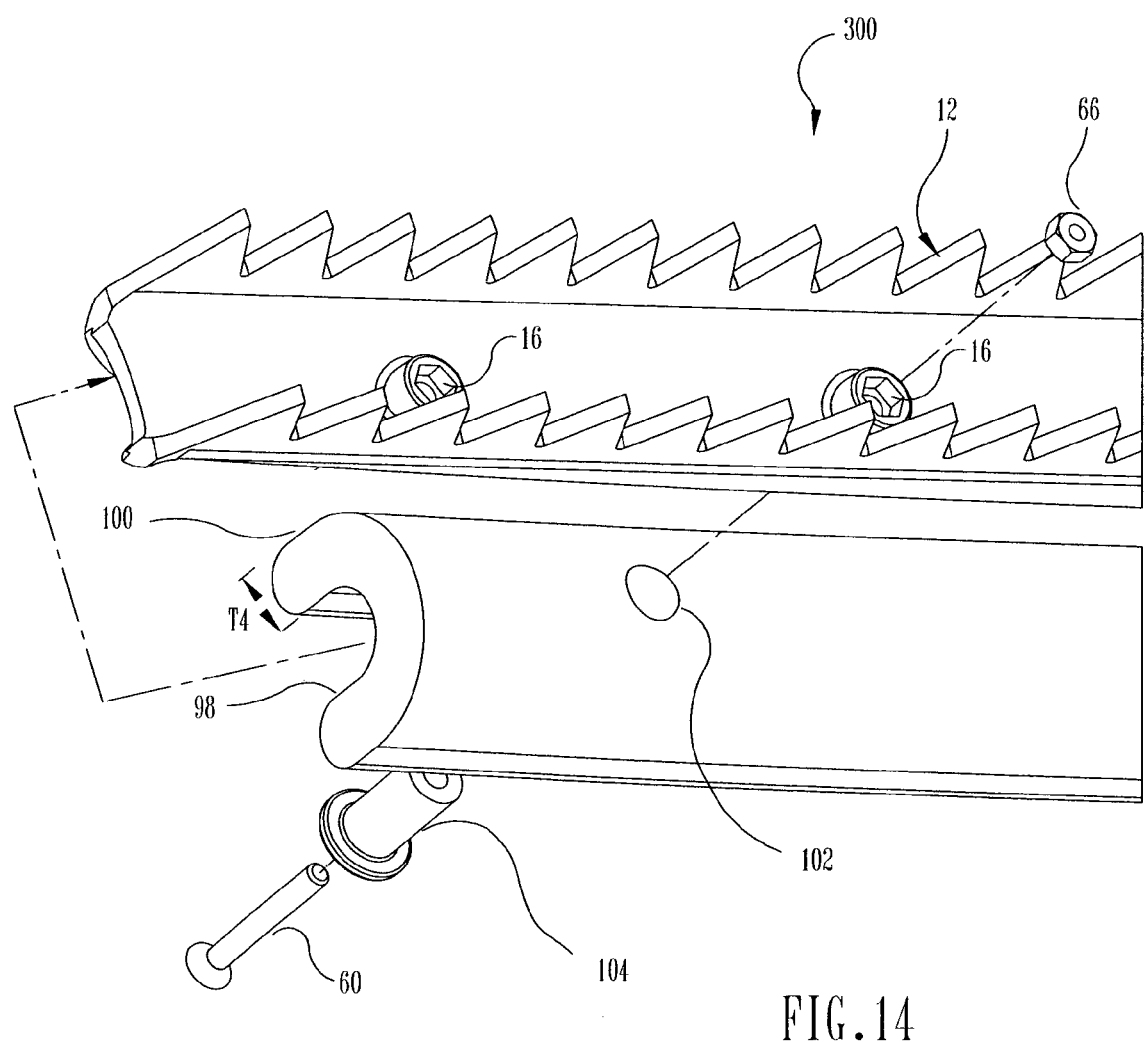
FIG. 14 illustrates an exploded detail view of a portion of the aquatic plant removal rake and float shown in FIG. 13 in accordance with an embodiment of the invention.

In one embodiment of the invention, illustrated in FIG. 14 as a portion of the rake 300 shown in FIG. 13, the float 92 may also include a plurality of float attachment points 102. The plurality of float attachment points 102 may be a plurality of openings defining a plurality of holes, wherein each of the respective holes of the plurality of holes may be adapted to allow the fastener 60 to freely pass therethrough.

As illustrated in FIG. 14, the plurality of float attachment points 102 may correspondingly align with the at least one implement lug 16 of the head 12, whereby the alignment of the plurality of float attachment points 102 with the implement lugs 16 permits a fastener 60 to first pass through a float attachment point 102 and then to engage an implement lug 16, whereby the float 92 is held in secure mechanical engagement to the head 12.

As illustrated in FIG. 14, in an embodiment of the invention, both a fastener 60 and a bushing 104 may pass through the float attachment points 102. The busing operates to prevent the float 92 from being crushed by any compressive force generated by a fastener 60 passing through the float attachment points 102 and engaging the implement lugs 16.

Figures 15, 16:
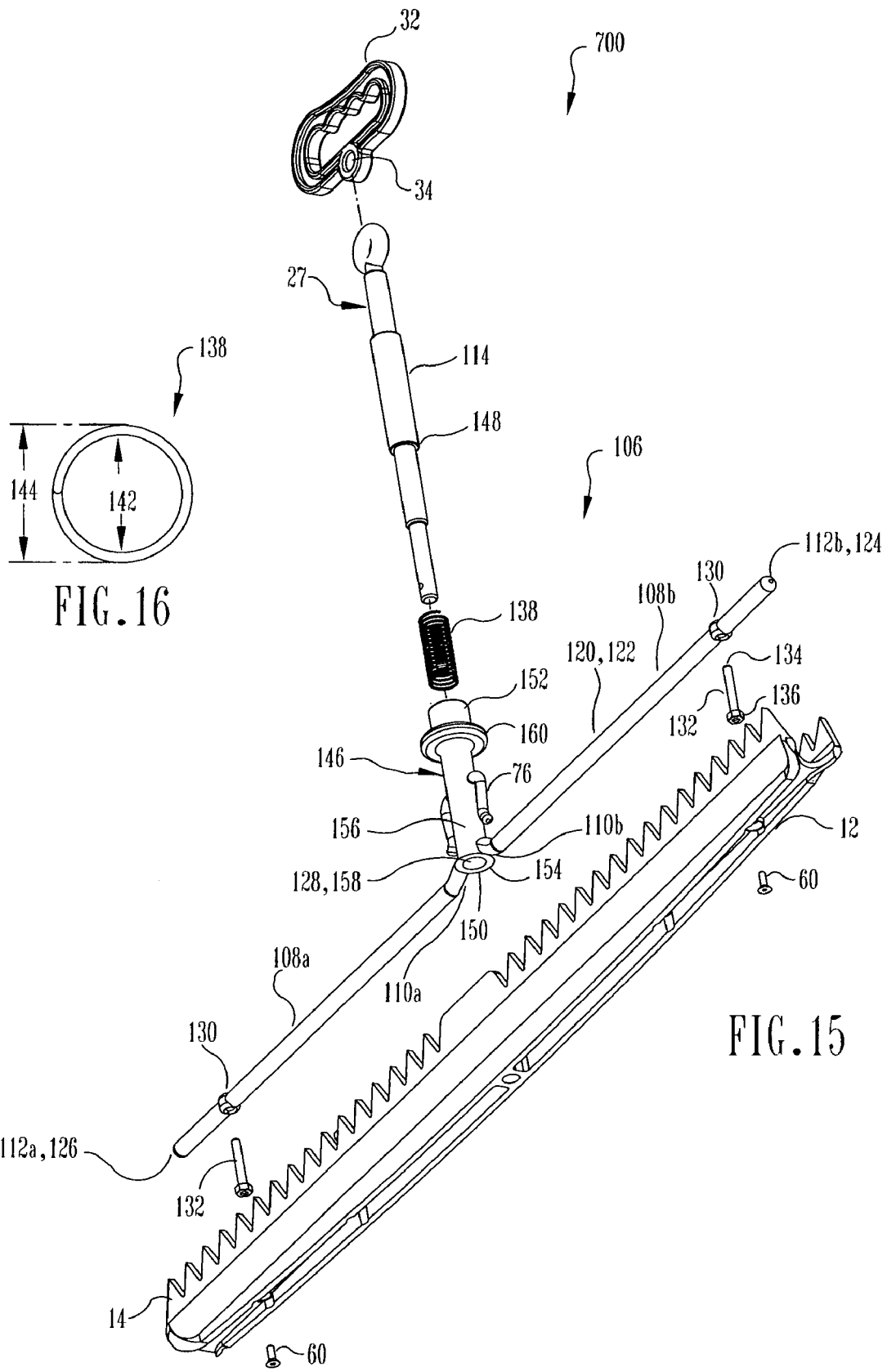
FIG. 15 illustrates an exploded view of an aquatic plant removal rake including an ejector and ejector spring in accordance with an embodiment of the invention.
FIG. 16 illustrates an end view of an ejector spring in accordance with an embodiment of the invention.

In another embodiment of the invention, illustrated in FIG. 15, an aquatic plant removal rake 700 may include an ejector 106. The ejector 106 is adapted to conveniently remove vegetation from the rake head 12 in an expeditious manner.

In one embodiment of the invention, as illustrated in FIG. 15, the ejector 106 generally including an injector rod 120 and a ejector handle 146. The ejector handle 146 is adapted to slidingly engage the handle 27, and further adapted to engage and retain each of the first elastic member ends 110a, 110b thereupon; and a plurality of fasteners 60, the plurality of fasteners 60 adapted to engage each of the second elastic member ends 112a, 112b and the implement attachment lugs formed in the head 12, whereby each of the second elastic member end 112a, 112b are retained in secure mechanical engagement with the head 12. In an embodiment of the invention, the injector rod includes a pair of elastic members 108a, 108b, the elastic members 108a, 108b each having a first elastic member end 110a, 110b and a second elastic member end 112a, 112b and adapted to engage aquatic vegetation retained in the tines 14, and further adapted to elastically elongate when a tensioning force is applied thereto.

In one embodiment of the invention, the ejector handle 146 may slide along the handle 27. In order to eject aquatic plants from the head 12, the ejector handle 146 may be drawn along the handle 27, away from the head 12. Drawing the ejector handle 146 away from the head 12 causes a tensioning force to be applied to the elastic members 108a, 108b, as each elastic member 108a, 108b is held in secure mechanical engagement to the head 12 at each respective second elastic member end 112a, 112b. Drawing the ejector handle 146 away from the head 12, causes the first elastic member ends 110a, 110b to move with the ejector handle 146, whereby the first elastic member ends 110a, 110b of the elastic members 108a, 108b are displaced from the head 12. The displacement of the elastic members 108a, 108b operates to eject aquatic vegetation retained in the tines 14. Following ejection of the aquatic vegetation, the ejector handle 146 may be released, whereby the tensioning force in the elastic members 108a, 108b will return the elastic members 108a, 108b to the stowed position in FIG. 18.

The ejector rod 120 includes an elongate member 122, the elongate member 122 having a first rod end 124, a second rod end 126, and a central rod aperture 128.

In one embodiment of the invention, each of the first rod end 124 and second rod end 126 include an associated rod guide 130, with each respective rod guide 130 adapted to slidingly engage a rod guide pin 132. Each respective rod guide 130 may be formed as an aperture in each of the first and second rod end 126.

In one embodiment of the invention, each respective rod guide pin 132 may include a guide end 134 adapted to slidingly engage a rod guide 130 and a threaded end 136 adapted to be placed in secure mechanical engagement with an implement lug 16 (shown in FIG. 19) formed in the head 12.

Figure 17:
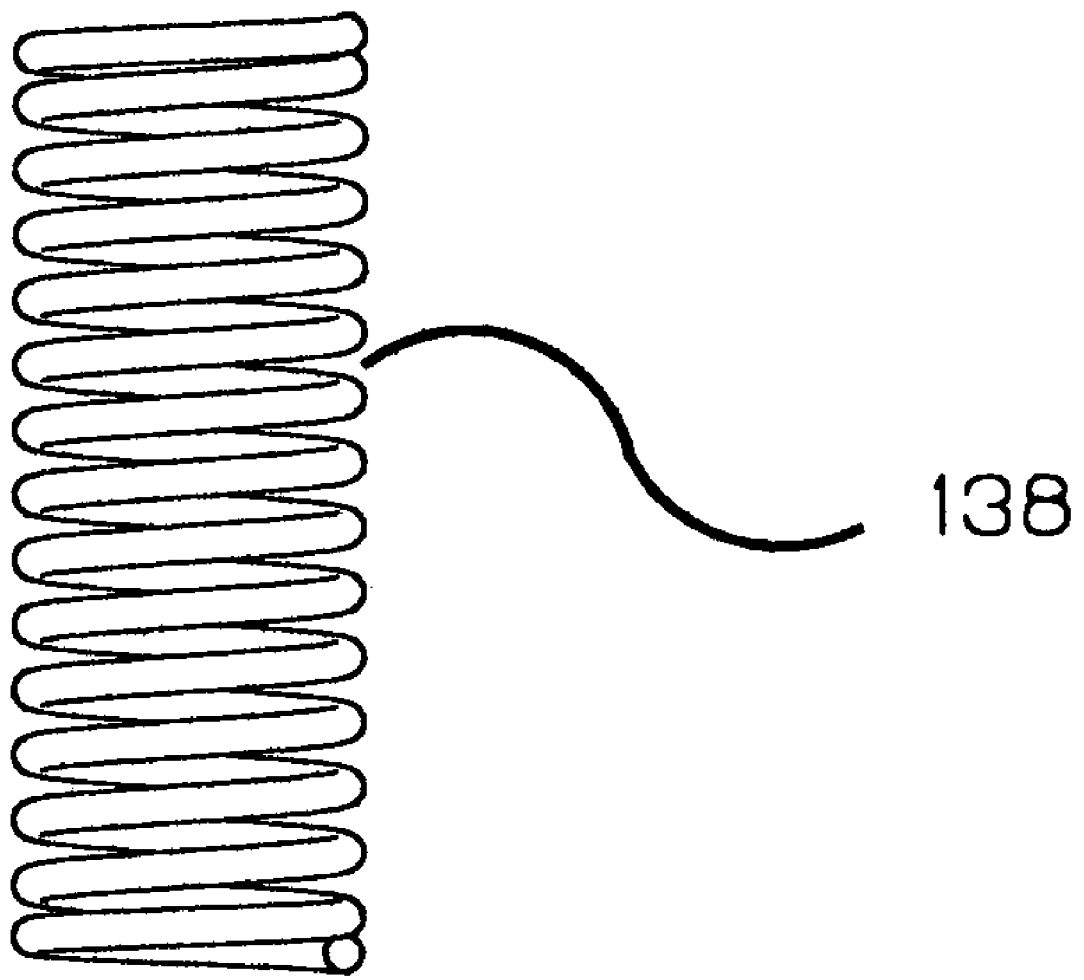
FIG. 17 illustrates a side elevational view of the ejector spring shown in FIG. 16 in accordance with an embodiment of the invention.

In another embodiment of the invention, the central rod aperture 128 is adapted to slidingly engage the handle 27 and is further adapted to be placed in mechanical engagement with an ejector spring 138 (shown in more detail in FIG. 17). As shown for illustrative purposes in FIG. 15-17, the ejector spring 138 may be formed as a coil spring having an associated inner spring diameter 142 and an outer spring diameter 144 (as shown in more detail in FIG. 16). The inner spring diameter 142 may be of sufficient size so as to allow the handle 27 to freely slide therethrough. The outer spring diameter 144 may be of sufficient size so as to be captured and retained by an ejector handle 146.

In an embodiment of the invention, shown in FIG. 15, including the ejector spring 138, the handle 27 may include a spring stop 148, the spring stop 148 including a portion of the handle 27 having a larger diameter than the remainder of the handle 27, the larger diameter corresponding to a diameter greater than that of inner spring diameter 142 but less than the diameter of the collar 114.

In another embodiment of the invention, the spring stop 148 may include a ring or other protrusion similar to that described above with respect to the handle locating protrusion 30 with reference to FIG. 2.

In one embodiment of the invention shown in FIG. 15 the ejector handle 146 may be integrally formed with the ejector rod 120 and include a tubular form having a round and hollow cross-sectional profile and including an inner handle opening 150 adapted to slidingly receive each of the handle 27 and the ejector spring 138 therethrough; an outer handle surface 160 adapted to be grasped by a user's hand; and a spring bearing surface 154 formed at a lower end 156 of the ejector handle 146 and adapted to receive the ejector spring 138 in mechanical engagement thereupon.

In one embodiment of the invention, the inner handle opening 150 has a diameter greater than that of each of the handle 27, the outer spring diameter 144, and the spring stop 148, so as to allow each of handle 27, the ejector spring 138 and the spring stop 148 to pass freely therethrough.

In one embodiment of the invention, the outer handle surface 160 is adapted to be grasped by a user of the aquatic plant removal rake 700. The outer handle surface 160 may include a diameter that permits a user's hand to easily and comfortably grasp the outer handle surface 160, and may further include a textured surface to enhance friction between a user's hand and the outer handle surface 160, such as knurling.

In another embodiment of the invention, the spring bearing surface 154 may include an annular plate formed at a lower end of the ejector handle 156. The spring bearing surface 154 may be integrally formed with each of the inner handle opening 150 and the outer handle surface 152, thereby taking the form of a hollow cylinder. The spring bearing surface 154 may include an annular opening defining a handle hole 158, the handle hole 158 including a diameter of a size sufficiently large to allow the passage of the handle 27 therethrough and of a size sufficiently small so as to prevent the passage of each of the ejector spring 138 and the spring stop 148 therethrough.

As illustrated in FIG. 15, the ejector handle 146 may include a raised grip surface 160, the raised grip surface 160 operating to provide a adaptability in the ease of a user gripping the ejector handle 146.

In another embodiment of the invention, also illustrated in FIG. 15, the ejector handle 146 may include cord retaining clips 76. The cord retaining clips 76 may include at least one prong adapted to removably secure the cord 26 (not shown) to the ejector handle 146 such that the cord 26 may be neatly stored, and the clips 76 may be integrally formed with the ejector handle 146.

Figure 18:
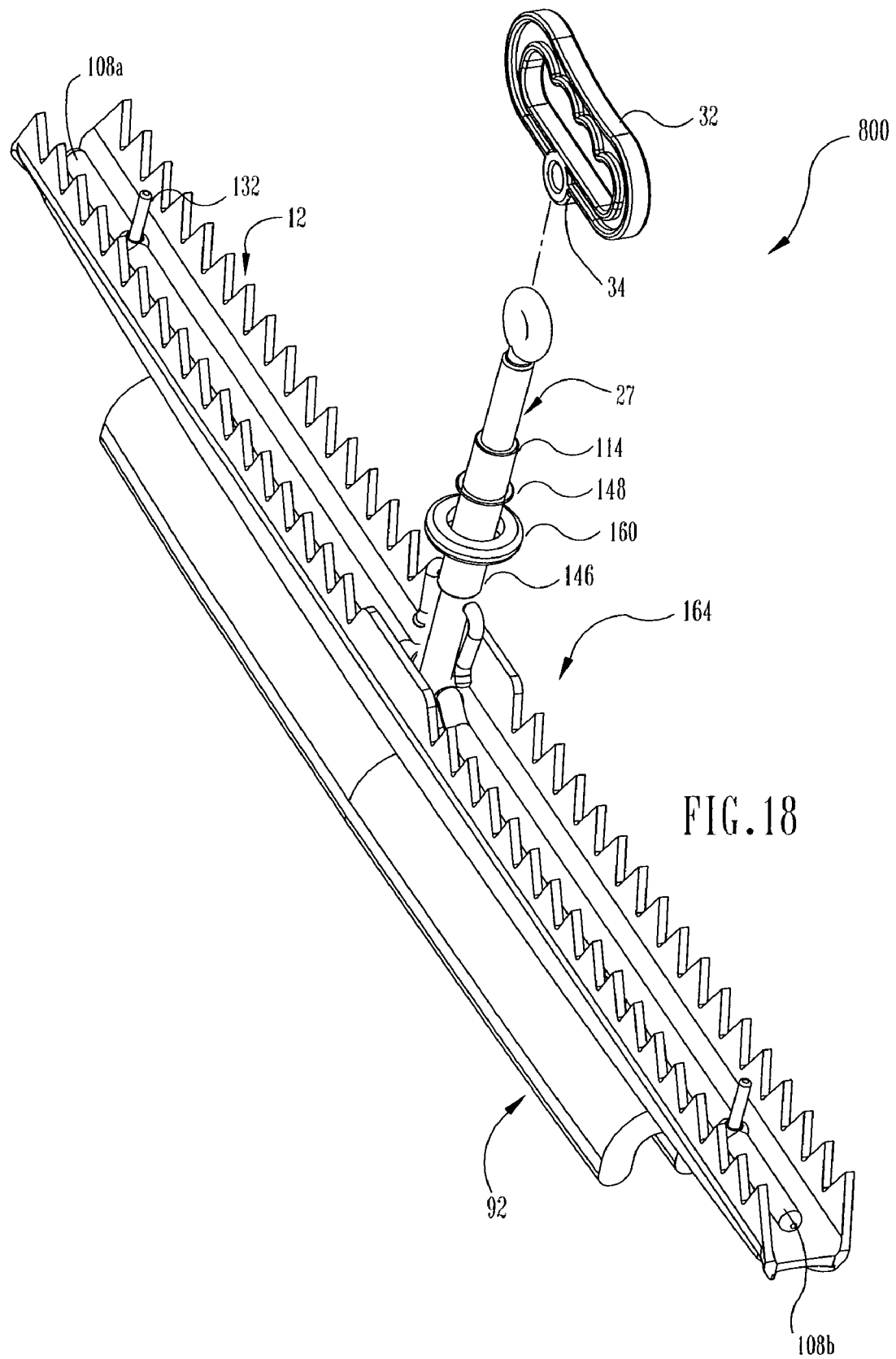
FIG. 18 illustrates a perspective view of an aquatic plant removal rake having an ejector rod in a stowed position in accordance with an embodiment of the invention.
Figure 19:
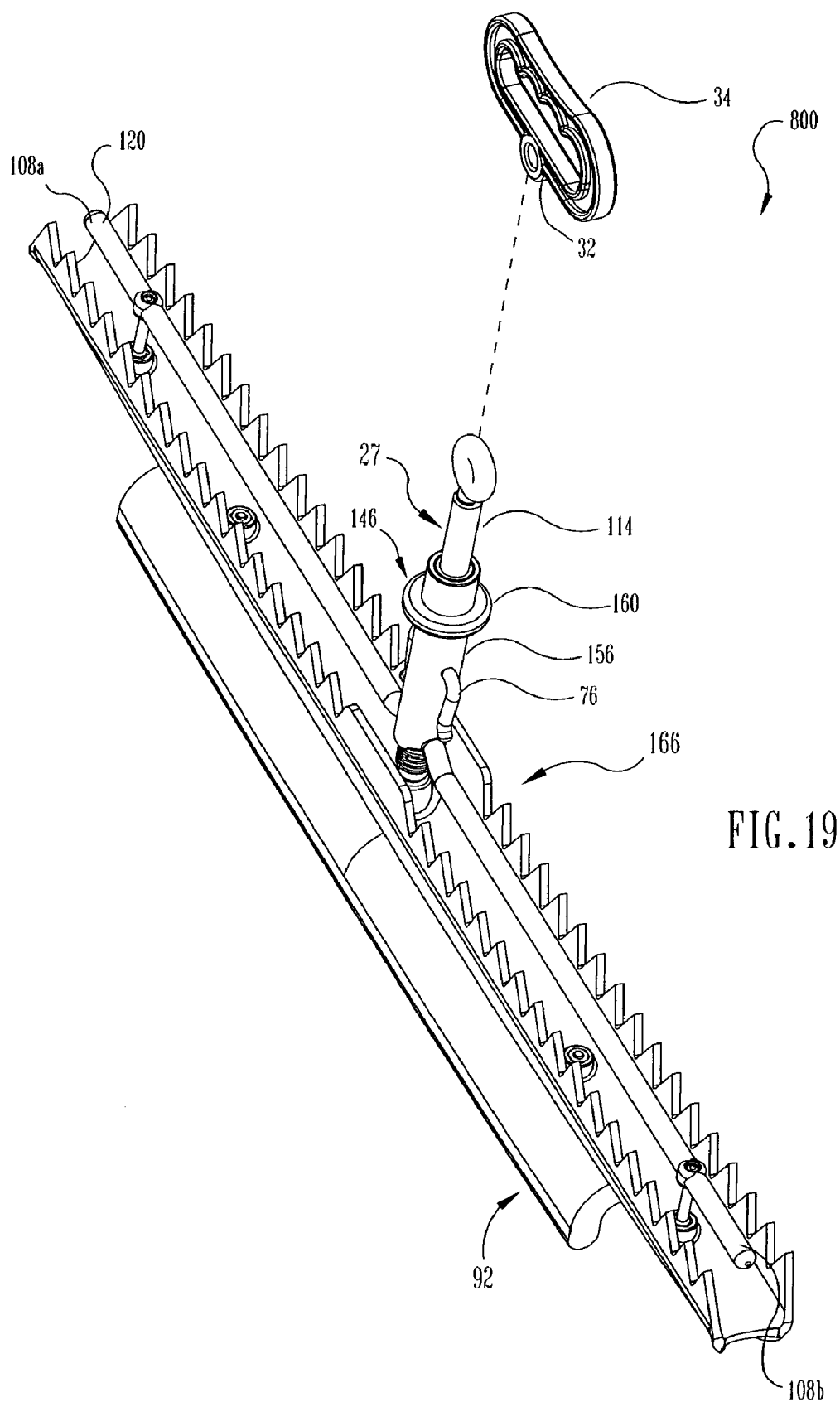
FIG. 19 illustrates a perspective view of an aquatic plant removal rake having an ejector rod in an ejecting position in accordance with an embodiment of the invention.

The rake 800 including a float 92 (as described with reference to FIGS. 18-19 herein) shown in FIGS. 18-19 is similar in structure to the rake 700 shown in FIG. 15 that includes an ejector 106.

In an embodiment of the invention, each of the elastic members 108 includes a stowed position 164 (shown in FIG. 18) and an extended position 166 (shown in FIG. 19). In the stowed position 164, each of the elastic members 108a, 108b rests upon the tine face 42 of the head 12, between the rows of tines 14.

In an embodiment of the invention shown in FIGS. 18-19, respectively, the ejector handle 146 may include a stowed position 164 and an ejecting position 166. In the stowed position 164, the ejector rod 120 may rest between the rows of tines 14 on the tine face 42 of the head 12.

In an embodiment of the invention, the ejector handle 146 may be moved to the ejecting position 166 by the movement of the ejector handle 146 away from the head 12 by way of sliding the ejector handle 146 along the handle 27 until such time as the spring bearing surface 154 and the ejector spring 138 cooperate with the spring stop 148 to limit the motion of the ejector handle 146 with respect to the handle 27. Such a movement of the ejector handle 146 draws the ejector rod 120 from between the rows of tines 14 to a position outside of the rows of tines 14, whereby aquatic vegetation retained in the tines 14 is ejected therefrom.

Movement of the ejector handle 146 described above operates to compress the ejector spring 138 a predefined distance, the predefined distance determined by an inherent spring rate of the spring and the amount of force applied to the ejector handle 146. When the ejector handle 146 is released, the ejector spring 138 returns to its uncompressed length, thereby returning the ejector handle 146, and consequently the ejector rod 120, to their respective stowed positions 164.

A method of using the aquatic plant removal rake to remove aquatic plants from a body of water is also provided and illustrated in flowcharts depicted in FIGS. 20-21.

In one embodiment of the invention, a method 200 of using the aquatic plant removal rake to remove aquatic plants from a body of water includes: removing the cord 26 from the cord retaining clips 76 (202); unwinding the cord 26 from around the head 12 (204); deploying the aquatic plant removal rake 10 by placing the head 12 at a desired point within a body of water (205); orienting the rake with respect to vegetation to allow at least one row of tines to contact vegetation (206); retrieving the head 12 using the retrieval handle and cord 26 (208), whereby aquatic vegetation in the body of water is mechanically engaged and retained by the tines 14; and removing the aquatic plants from the tines 14 (210).

In another embodiment of the invention, the method of using the aquatic plant removal rake may include allowing the head 12 to sink to a desired depth in the body of water, such that vegetation at the desired depth may be removed. The orientation of the rake with respect to a ground surface and to the respective vegetation may be in any direction that allows the rake head 12 to contact the vegetation. Either side of the head 12 may contact the vegetation to remove the vegetation thereby allowing for a "self-orienting" rake.

Conventional rakes with only one set of tines are typically formed such that the handle is perpendicular to downward facing tines (L-shaped rake) and removes vegetation when the rake is oriented such that the rake handle is substantially parallel handle to a ground surface. Unlike the rake of the present invention, conventional rakes function to remove vegetation only when the set of tines are properly oriented with respect to the ground surface.

Figure 22:
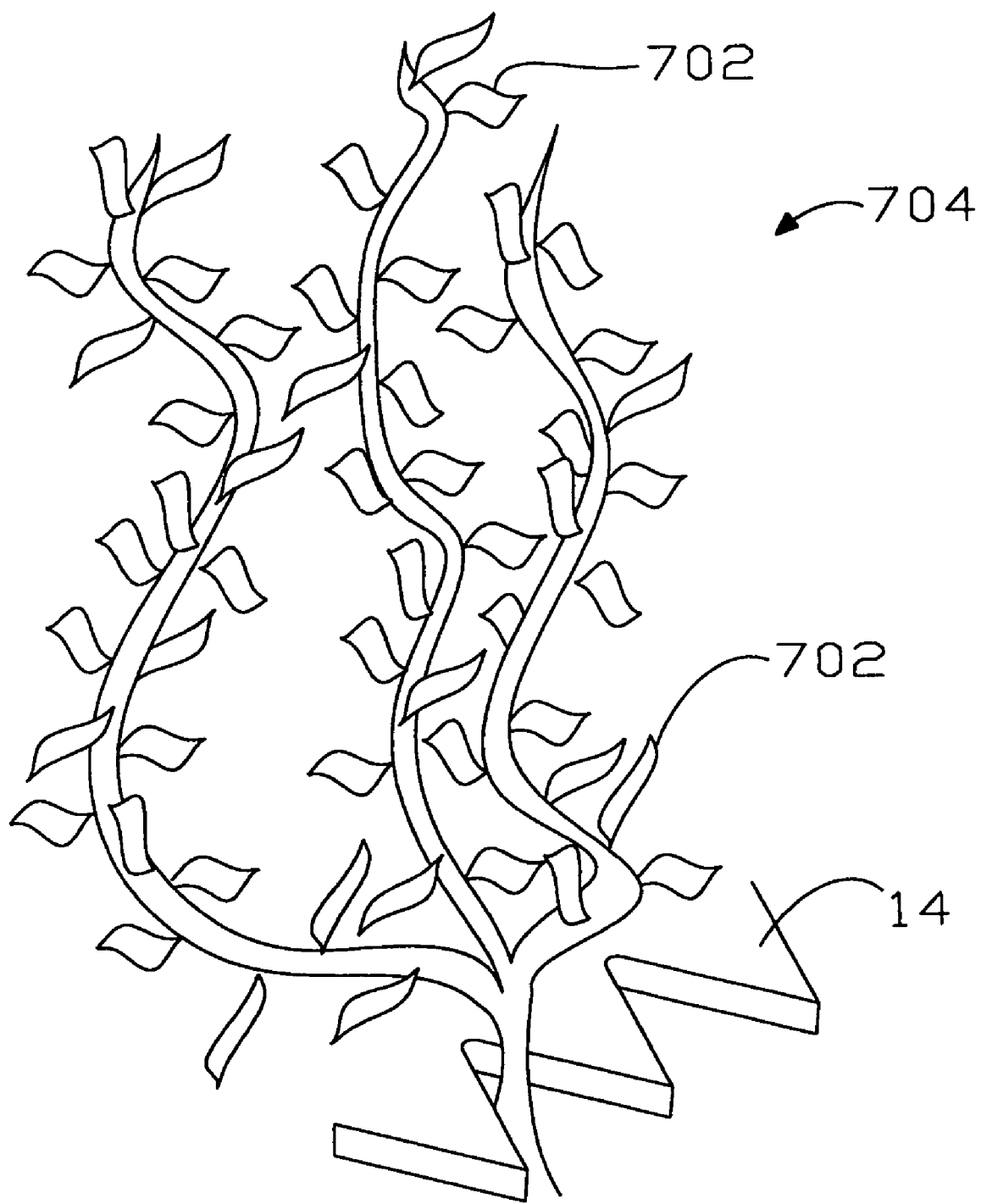
FIG. 22 is an in-use view of an aquatic plant removal rake in accordance with an embodiment of the invention.

FIG. 22 illustrates an in use view of the rake head, in particular the tines 14 of the head 12 contacting aquatic vegetation 702 to remove the vegetation from the body of water 704.

In another embodiment of the invention, a method 210 of removing the aquatic plants from the tines, depicted in the flowcharts referenced in FIGS. 20-21, may include a user sliding the ejector handle 146 away from the head 12 (212) (shown in FIG. 21), such that aquatic plants engaged and retained by the plurality of tines 14 may be ejected therefrom by the ejector rod 120.

In another embodiment of the invention, (illustrated in FIG. 21) the method of using the aquatic plant removal rake 700 may include a user releasing the ejector handle 146 (214), whereby the ejector rod 120 returns to a stowed position 164.

In another embodiment of the invention including a pair of elastic members 708a, 708b, a user may eject aquatic vegetation from a rake 900, similar to rakes 700, and 800 described herein, by pulling a collar 714, which in turn, stretches the elastic members 708a, 708b and operates to eject vegetation from the rake 900.

In another embodiment of the invention including a pair of elastic members 708a, 708b, the user may release the collar 714, whereby the collar is retracted along the handle 727 toward a head 712, thereby returning the elastic members 708a, 708b to each of their respective stowed positions 716.

In an embodiment of the invention, the methods 200, 210 may be repeated until a desired amount of aquatic vegetation has been cleared from a desired area of the body of water.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. An aquatic plant removal rake comprising:
   a head having at least two co-planar set of tines integrally formed thereupon, a plurality of implement lugs integrally formed thereupon, and a handle aperture receiving a main handle therethrough;
   the main handle having a handle cord end that includes an eyelet receiving a cord therethrough, and a handle head end that includes a main handle locating protrusion, the handle head end received by the head;
   a retrieving handle including a retrieving handle cord aperture integrally formed thereupon receiving the cord, and a grip for gripping by a user or users;
   the cord placing each of the main handle and the retrieving handle in mechanical communication with one another, whereby forces transmitted to the retrieving handle are transferred to each of the main handle and the head; and
   a float in secure mechanical engagement to the head including
      a generally arcuate cross-sectional profile,
      a predefined length defined by a first float end and a second float end,
      an associated thicknesses defined by the distance between an inner float surface and an outer float surface,
      a plurality of float attachment points including a plurality of openings defining a plurality of holes that each allow each respective one of a plurality of fasteners to freely pass therethrough;
   an ejector that conveniently removes vegetation from the rake head in an expeditious manner including
      an ejector rod including an elongate member having a first rod end, a second rod end, and a central rod aperture, wherein each of the first rod end and second rod end include an associated rod guide, with each respective rod guide adapted to slidingly engage a rod guide pin, and wherein each respective rod guide pin includes a guide end that slidingly engages the rod guide and a threaded end in secure mechanical engagement with an associated one of the plurality of implement lugs formed in the head,
   wherein the central rod aperture slidingly engages the main handle and is in mechanical engagement with an ejector spring, and wherein the ejector spring is retained within an ejector handle and is formed as a coil spring having an associated inner spring diameter of sufficient size so as to allow the main handle to freely slide therethrough and an outer spring diameter larger than the inner spring diameter, and wherein the ejector handle is integrally formed with the ejector rod and includes a tubular form having a round and hollow cross-sectional profile and including
      an inner handle opening slidingly receiving each of the main handle and the ejector spring therethrough;
      an outer handle surface for grasping by a user's hand; and
      a spring bearing surface formed at a lower end of the ejector handle and receiving the ejector spring in mechanical engagement thereupon, wherein the inner handle opening has an inner handle diameter greater than that of each of the main handle, the outer spring diameter, and the spring stop, so as to allow each of the main handle, the ejector spring and the spring stop to pass freely therethrough, and
      a stowed position and an ejecting position, wherein in the stowed position, the ejector rod rests between the at least two co-planar set of tines on the head, and wherein the ejector handle is moved to the ejecting position by movement of the ejector handle away from the head by way of sliding the ejector handle along the main handle until such time as the spring bearing surface and the ejector spring cooperate with the spring stop to limit the motion of the ejector handle with respect to the main handle, drawing the ejector rod from between the at least two co-planar set of tines to a position outside of the at least two co-planar set of tines, whereby aquatic vegetation retained in the tines is ejected therefrom, wherein movement of the ejector handle operates to compress the ejector spring a predefined distance determined by an inherent spring rate of the ejector spring and the amount of force applied to the ejector handle, such that when the ejector handle is released, the ejector spring returns to an uncompressed length, thereby returning the ejector handle to the stowed position, and consequently the ejector rod to a stowed position of the ejector rod.

2. The aquatic plant removal rake of claim 1, wherein each of the plurality of float attachment points correspondingly aligns with each of the plurality of implement lugs of the head permitting each respective one of the plurality of fasteners to first pass through each respective one of the float attachment points and then to engage each respective one of the plurality of implement lugs, whereby the float is held in secure mechanical engagement to the head.

3. The aquatic plant removal rake of claim 1, further comprising:
a spring stop including a portion of the main handle having a larger diameter than the remainder of the main handle and than that of the inner spring diameter.

4. The aquatic plant removal rake of claim 1, wherein the ejector handle further comprises:
cord retaining clips integrally formed with the ejector handle and including at least one prong removably securing the cord to the ejector handle such that the cord may be neatly stored.

* * * * *